US012681265B2

(12) United States Patent
Bouzit et al.

(10) Patent No.: US 12,681,265 B2
(45) Date of Patent: Jul. 14, 2026

(54) OPTICAL INSTRUMENT POSITIONING DEVICE AND METHOD

(71) Applicants:UNIVERSITE PARIS-SACLAY, Gif-sur-Yvette (FR); CENTRE NATIONAL DE LA RECHERCHE SCIENTIFIQUE, Paris (FR)

(72) Inventors: Mehdi Bouzit, Les Ulis (FR); Vincent Hamm, Gif-sur-Yvette (FR); Guillaume Lequertier, Mareuil les Meaux (FR)

(73) Assignees: UNIVERSITE PARIS-SACLAY, Gif-sur-Yvette (FR); CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 261 days.

(21) Appl. No.: 18/683,588

(22) PCT Filed: Aug. 1, 2022

(86) PCT No.: PCT/EP2022/071588
§ 371 (c)(1),
(2) Date: Feb. 14, 2024

(87) PCT Pub. No.: WO2023/025531
PCT Pub. Date: Mar. 2, 2023

(65) Prior Publication Data
US 2025/0138278 A1 May 1, 2025

(30) Foreign Application Priority Data
Aug. 25, 2021 (FR) ...................................... 2108887

(51) Int. Cl.
*G02B 7/182* (2021.01)
*G02B 7/183* (2021.01)

(52) U.S. Cl.
CPC ........... *G02B 7/1827* (2013.01); *G02B 7/183* (2013.01)

(58) Field of Classification Search
CPC .................. G02B 7/1827; G02B 7/183; G05B 2219/40246; G05B 2219/45179; F16H 25/18; F16H 2025/2059; F16H 25/20
See application file for complete search history.

(56) References Cited

U.S. PATENT DOCUMENTS

| | | | |
|---|---|---|---|
| 5,350,911 A | * | 9/1994 | Rafanelli .................. G01J 9/00 356/121 |
| 2009/0045699 A1 | | 2/2009 | Otaguro |

(Continued)

FOREIGN PATENT DOCUMENTS

| | | |
|---|---|---|
| JP | 2003075572 A | 3/2003 |
| WO | 2012041462 A2 | 4/2012 |

OTHER PUBLICATIONS

International Search Report and Written Opinion received for PCT/EP2022/071588, mailed Nov. 28, 2022.

(Continued)

*Primary Examiner* — Euncha P Cherry
(74) *Attorney, Agent, or Firm* — Greer, Burns & Crain, Ltd

(57) ABSTRACT

A device for positioning an equipment such as a space optical instrument mirror, including: a platform intended to receive the equipment or forming a portion of the equipment, and six actuating members connected to the platform; each of the actuating members having a body that is elastically deformable and a control mechanism configured to be able to deform the body to modify the position of the platform.

6 Claims, 5 Drawing Sheets

(56)       References Cited

U.S. PATENT DOCUMENTS

2017/0030514  A1       2/2017  Kurose et al.
2017/0284522  A1      10/2017  Kurose et al.

OTHER PUBLICATIONS

French Search Report received for Application No. 2108887, dated
Apr. 22, 2022.

* cited by examiner

OPTICAL INSTRUMENT POSITIONING DEVICE AND METHOD

BACKGROUND

Technical Field

The invention relates to the field of positioning equipments that require precise positioning, for example an optical instrument equipment.

The invention is of particular, but non-limitative, interest in the field of space instrumentation.

In the field of space instrumentation, it is known to position equipments such as mirrors or lenses using opto-mechanical mountings.

Document WO2012/041462A2 discloses such a positioning device, comprising six length-adjustable legs forming a hexapod capable of modifying the position of the equipment in the six degrees of freedom.

However, the positioning of the equipment using such a device proves to be lengthy and tedious as it is necessary to add and remove adjustment discs in order to modify the length of each of the legs. This requires that the steps of measuring, determining the thickness of the discs, disassembly, adjustment and reassembly are performed iteratively.

In addition, such a device poses problems of reproducibility of the adjustment in view of the addition and removal of the discs and of the corresponding assembly and disassembly steps.

SUMMARY

The invention aims to overcome the drawbacks of the conventional positioning devices and, in particular, to simplify the positioning of an equipment of a space optical instrument or of any other instrument requiring precise positioning in three-dimensional space.

To this end, a subject of the invention is a device for positioning an equipment such as a space optical instrument mirror, comprising a platform intended to receive the equipment or forming a portion of the equipment and one or more actuating members connected to the platform. According to the invention, at least one of said actuating members comprises an elastically deformable body and a control mechanism configured to be able to deform the body so as to modify the position of the platform.

Such an actuating member makes it possible to modify the length of the body and as a result the position of the platform and of the equipment without the use of removable adjustment components such as discs. The equipment can thus be displaced or repositioned by simple deformation of the body of the actuating member.

The invention thus makes it possible to simplify the positioning of the equipment while ensuring precise and reproducible positioning.

In an embodiment, the body comprises an effector component and two arms each connected to the effector component such that the arms are spaced apart with respect to one another according to a control direction, the control mechanism being configured to apply to the arms a mechanical force capable of modifying the distance separating them according to the control direction so as to displace the effector component according to an actuation direction that is perpendicular or oblique with respect to the control direction.

In particular, the body can be configured such that bringing these arms closer together, respectively moving them apart, according to the control direction causes a displacement of the effector component in a first sense, respectively a second sense, according to the actuation direction.

The effector component is preferably formed by a portion of the body that can form an end of the body along the actuation direction.

The effector component can in this case be formed by a simple structural component of the body connecting the arms to one another.

The effector component can thus be connected to the platform so as to displace it when the body is deformed under the action of the control mechanism.

In an embodiment, each of the arms of the body comprises a linking part connected to the control mechanism and a flexible component such as a strip connecting the linking part to the effector component of the body.

In an embodiment, the control mechanism comprises a micrometer screw or differential screw.

A micrometer screw makes it possible to obtain a precise adjustment in a simple manner.

The micrometer screw can comprise a first external thread and a second external thread. The first external thread can cooperate with an internal thread formed by a first portion of the body, for example by said linking part of one of the arms of the body, or by a first part of the control mechanism connected to this first portion of the body. The second external thread can cooperate with an internal thread formed by a second portion of the body, for example by said linking part of the other arm of the body, or by a second part of the control mechanism connected to this second portion of the body.

In an embodiment, the micrometer screw forms a first adjustment screw, the control mechanism comprising a second adjustment screw provided with an orifice forming an internal thread which cooperates with an external thread of the first screw, the control mechanism being configured to be able to deform the body under the action of a rotational displacement of the first screw and/or of the second screw.

In the context of this embodiment, the second screw preferably comprises an external thread which cooperates with a part of the control mechanism connected to said second portion of the body.

In an embodiment, the actuating member comprises means for guiding said arms of the body translationally along the control direction.

The guide means can be formed by said first and second parts of the control mechanism, or by two parts each integral with the respective one of the arms of the body, these parts preferably being connected to one another by a sliding pivot link or a slide link.

In an embodiment variant, the control mechanism comprises a piezoelectric actuator.

This actuator can comprise a deformable piezoelectric material interposed between the arms of the body of the actuating member.

In another embodiment variant, the control mechanism comprises a stepper motor.

In an embodiment, the body is connected to the platform by a linking member, this linking member being connected to the body by a link defining at least one degree of freedom.

More particularly, this linking member can be connected to said effector component.

The link between this linking member and the body can be a pivot link or ball joint link.

According to a first variant, the linking member is connected to the body by a rod.

This link rod can thus form a ball joint link defining three degrees of freedom.

According to a second variant, the linking member is connected to the body by a strip.

This link strip can thus form a pivot link defining a single degree of freedom.

Alternatively or additionally, the actuating member can comprise a linking member that is similar to the one which has just been described and intended to connect the body to the base.

In an embodiment, said actuating members comprise six actuating members.

The actuating members can thus form a hexapod.

Preferably, each of the actuating members comprises an elastically deformable body and a control mechanism configured to be able to deform the body so as to modify the position of the platform.

In an embodiment, the device comprises a measuring system configured to determine a position of the platform.

The measuring system can be optical.

According to another aspect, the invention also relates to a method for positioning an equipment, such as a space optical instrument mirror, using a device as defined above.

In an implementation, the method comprises a step of determining the position of the platform using the measuring system mentioned above, and a step of determining a target configuration of one or more of said actuating members, as a function of a target position of the platform.

The invention also relates to a computerized tool configured to help an operator to implement a method as defined above.

Preferably, this tool includes a model of the device mentioned above.

The tool can be configured to provide instructions for adjustment starting from an initial position of the platform of this device.

This initial position can be determined using the measuring system mentioned above.

Other advantages and characteristics of the invention will become apparent on reading the following detailed, non-limitative description.

BRIEF DESCRIPTION OF THE DRAWINGS

The Following Detailed Description Makes Reference to the Attached Drawings, in which.

DETAILED DESCRIPTION

Figure 1:
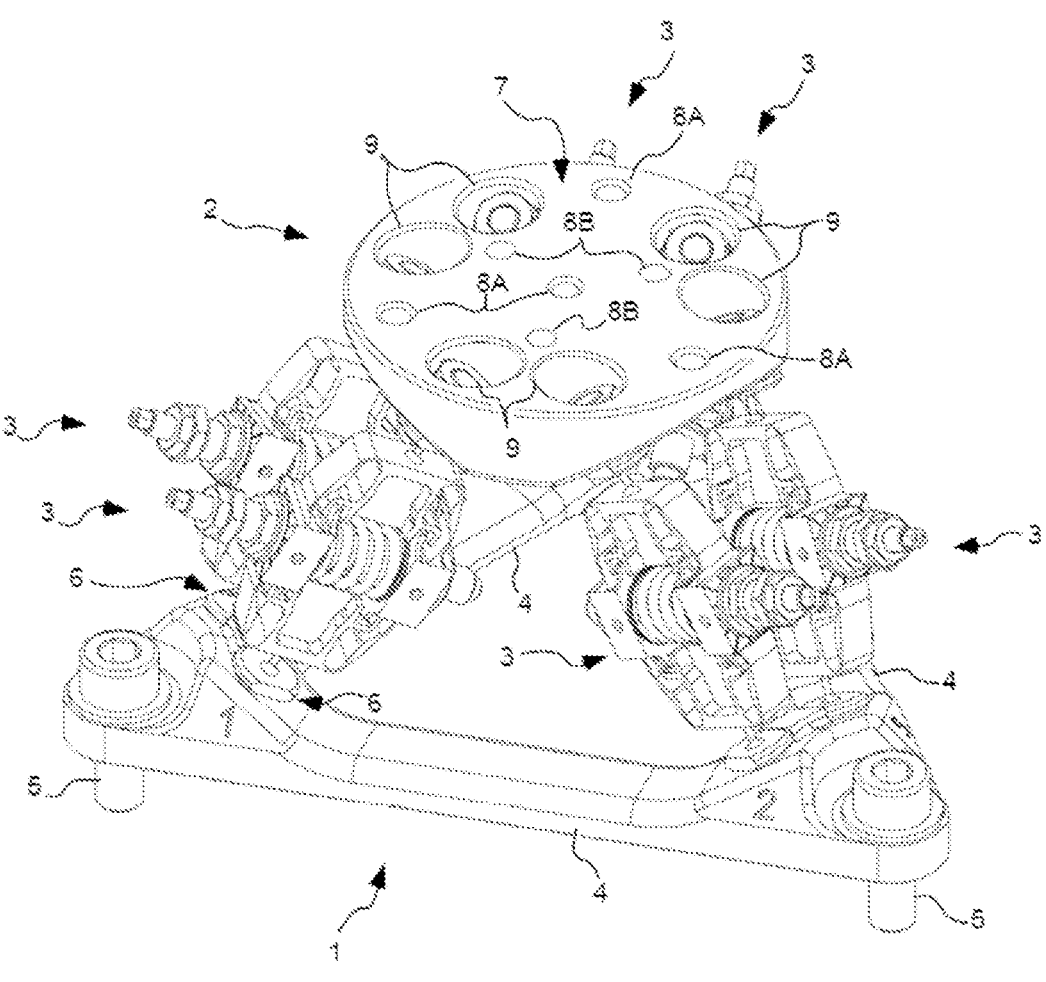
FIG. 1 is a diagrammatic perspective view of a device for positioning an equipment such as a parabolic mirror, comprising actuating members according to a first embodiment of the invention.

FIG. 1 shows a device according to the invention.

In this example, which is in no way limitative, the device comprises a base 1, a platform 2 and six actuating members 3.

The base 1 forms a tripod that is generally triangular which has three ends connected to one other by crosspieces 4.

Each end of the base 1 comprises a fastening means 5 provided to firmly connect the device to a main support (not shown).

At each of its ends, the base 1 comprises two openings 6 each provided with a counterbore defining a housing for a nut (not visible; see further below).

The platform 2 comprises a body defining a circular flat upper surface 7.

The body of the platform 2 comprises, on one side, orifices 8A which each come out on the upper surface 7. On the other side, the body of the platform 2 is passed through by orifices 8B, as well as by openings 9 which are each provided with a counterbore defining a housing for a nut (see further below).

In the example in FIG. 1, each of the actuating members 3 comprises two ends, of which one is received in the respective one of the openings 6 of the base 1 and the other is received in the respective one of the openings 9 of the platform 2.

The actuating members 3 are configured to be able to modify the position of the platform 2 relative to the base 1.

In this example, the device is intended to support a parabolic mirror of a space optical instrument (not shown). The mirror can be positioned on the platform 2 using guide pins (not shown) mounted gripped in the orifices 8A and can be locked to the platform 2 by screws (not shown) passing through the orifices 8B.

In the context of such an application, the base 1 can be fastened to a portion of a satellite (not shown) forming the main support mentioned above.

One of the actuating members 3 in FIG. 1 will now be described with reference to FIGS. 2 and 3. The following description applies by analogy to each of the actuating members 3 in FIG. 1.

Figure 2:
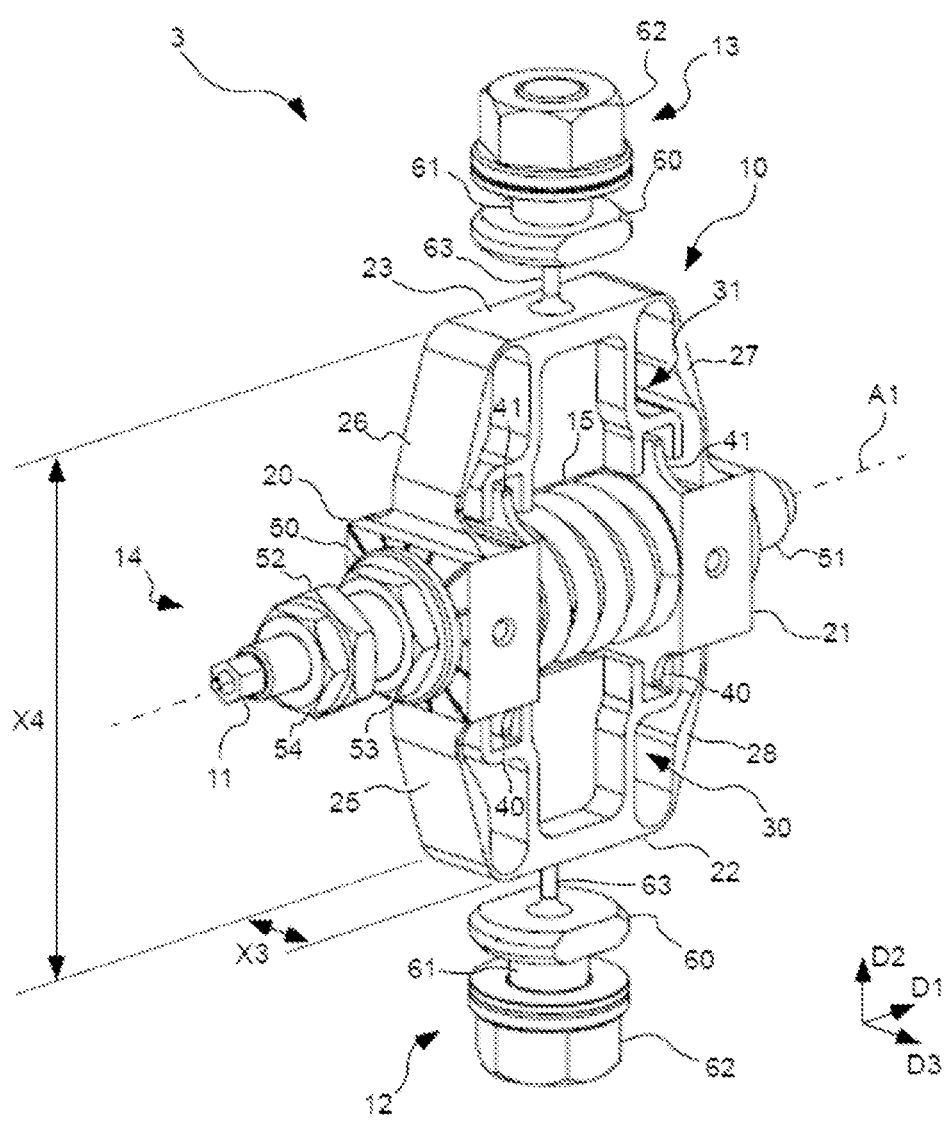
FIG. 2 is a diagrammatic perspective view of one of the actuating members in FIG. 1.
Figure 3:
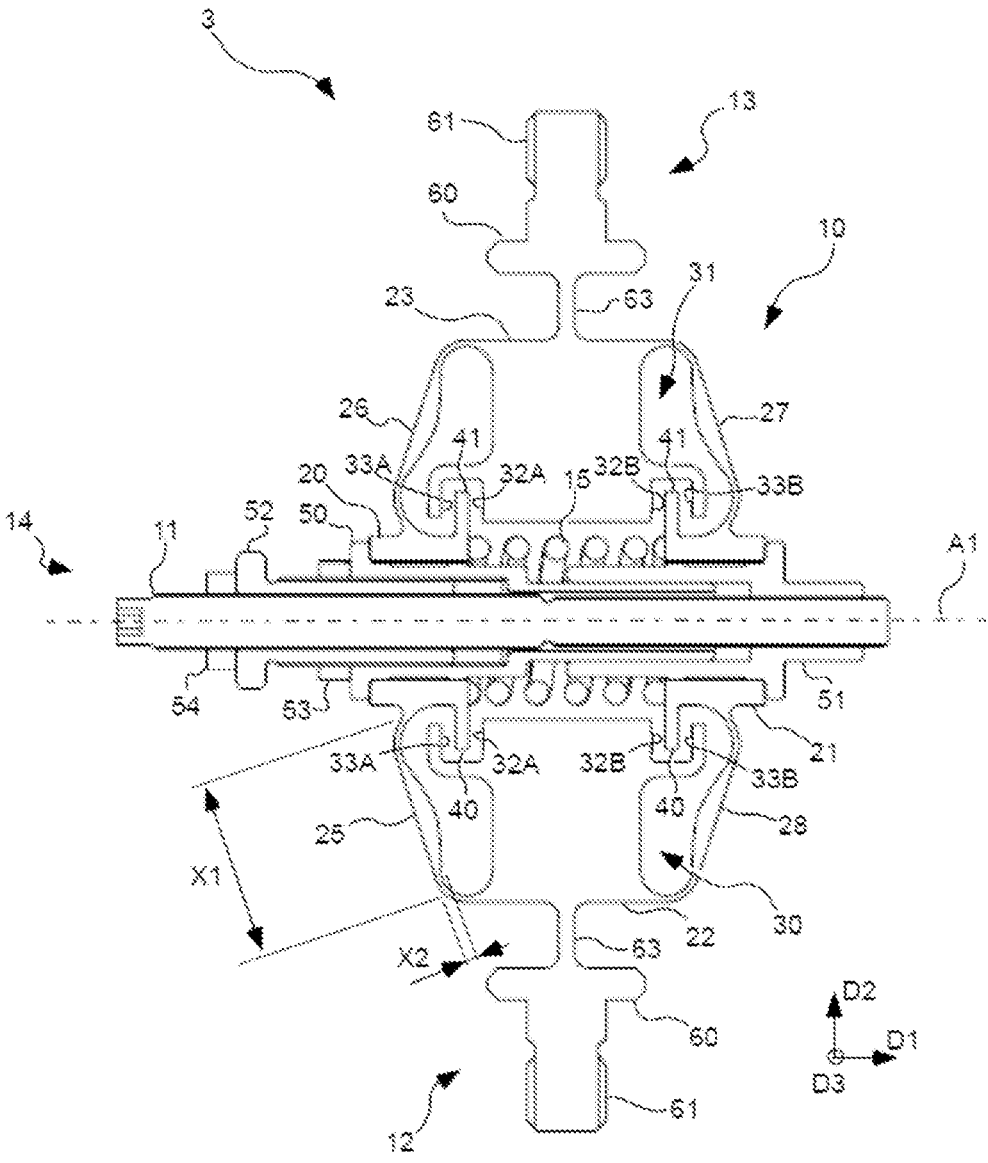
FIG. 3 is a diagrammatic cross-section view of the actuating member in FIG. 2.

FIGS. 2 and 3 comprise a frame of reference D1-D2-D3 defining respectively a first reference direction, a second reference direction and a third reference direction.

In general, the actuating member 3 in FIGS. 2 and 3 comprise a body 10, two linking members 12 and 13, a control mechanism 14 and a pretension spring 15.

The body 10, also called "bar", extends along the direction D2, called "actuation direction", and comprises in this example two components 22 and 23 forming respectively a lower end and an upper end of the body 10, as well as two arms connecting the lower 22 and upper 23 ends to one another.

A first of these arms, situated on the left in FIGS. 2 and 3, comprises a central component 20 which forms a part for linking the body 10 to the control mechanism 14, as well as two components 25 and 26 connecting the linking part 20 to the lower 22 and upper 23 ends, respectively.

The second of these arms, situated on the right in FIGS. 2 and 3, also comprises a central component 21 which forms a part for linking the body 10 to the control mechanism 14, as well as two components 27 and 28 connecting the linking part 21 to the upper 23 and lower 22 ends, respectively.

The linking parts 20 and 21 each have a shape that is generally parallelepipedal, allowing them to transmit forces to the other portions of the body 10 without being deformed.

In this example, the two arms of the body 10 are symmetrical with respect to one another with respect to a plane D2-D3 and the lower 22 and upper 23 ends of the body 10 are symmetrical with respect to one another with respect to a plane D1-D3.

The linking parts 20 and 21 of the body 10 are spaced apart with respect to one another according to the first direction D1, called "control direction".

The lower 22 and upper 23 ends of the body 10 are spaced apart with respect to one another according to the actuation direction D2.

Each of the components 25 to 28 forms in this example a flexible strip, i.e. a component having a thickness that is relatively small with respect to its main dimensions.

Thus, with reference to FIG. 3, the strip 25 extends between the linking part 20 and the lower end 22 so as to define a length X1 that is relatively large with respect to the average thickness X2 of this strip 25.

With reference to FIG. 2, the strip 25 moreover extends along the direction D3 so as to define a width X3 that is relatively large with respect to the average thickness X2 of this component 25.

The same is true for the strips 26, 27 and 28, which in this example have the same geometry as the strip 25.

In this example, the body 10 of the actuating member 3 also comprises two stop components 30 and 31 which extend between the two arms of the body 10 according to the direction D1 and at a distance from the strips 25-28 so as not to prevent their deformation.

The stop component 30 extends to the right of an inner surface of the lower end 22 and the stop component 31 extends to the right of an inner surface of the upper end 23.

Each of these stop components 30 and 31 has, opposite the inner surface of the end 22, or respectively 23, a free end in the shape of a double fork defining two inner abutment surfaces 32A and 32B and two outer abutment surfaces 33A and 33B.

The abutment surfaces 32A, 32B, 33A and 33B of each of the stop components 30 and 31 are spaced apart from one another according to the direction D1.

With reference to FIG. 3, the linking part 20 of the body 10 comprises two tabs 40 and 41 configured to extend, according to the direction D1, between the abutment surfaces 32A and 33A of the stop components 30 and 31. Symmetrically, the linking part 21 of the body 10 also comprises two tabs 40 and 41 configured to extend, according to the direction D1, between the abutment surfaces 32B and 33B of the stop components 30 and 31.

The body 10 is configured such that, when a force is applied to the linking parts 20 and 21 so as to bring them closer to one another according to the control direction D1, the strips 25 to 28 are deformed, causing the ends 22 and 23 to move apart according to the actuation direction D2, i.e. an increase of the length X4 of the body 10 of the actuating member 3 (see FIG. 2).

This results in a relative displacement of the upper end 23 of the body 10, also called "effector component", along the actuation direction D2 in a sense heading towards the platform 2.

Conversely, when a force is applied to the linking parts 20 and 21 so as to move them apart according to the control direction D1, the strips 25 to 28 are deformed, causing the ends 22 and 23 to be brought closer together according to the actuation direction D2, i.e. a reduction of the length X4 of the body 10 of the actuating member 3.

This results in a relative displacement of the effector component 23 of the body 10 along the actuation direction D2 in a sense heading towards the base 1.

Of course, the flexibility of the strips 25-28 as well as the elastic deformability of the body 10 can result from numerous geometries of the body 10 and in particular of the components 25-28. For example, in embodiments that are not shown, each of the strips 25-28 in FIGS. 2 and 3 can comprise one or more grooves or openings or also be replaced by several strips having a width smaller than the width X3 of the strips in FIG. 2, or also by strips in the shape of an ellipse.

In this example, the inner abutment surfaces 32A and 32B limit the displacement of the linking parts 20 and 21 in the sense of a bringing together thereof according to the direction D1, while the outer abutment surfaces 33A and 33B limit the displacement of the linking parts 20 and 21 in the sense of a moving apart thereof according to the direction D1.

The stop components 30 and 31 thus make it possible to limit the deformation of the body 10 so as not to go beyond its elastic limit.

A stiffening or braking component such as adhesive can be interposed between the tabs 40 and 41 of each of the linking parts 20 and 21 and the surfaces 32A and 32B, or 33A and 33B, to lock the adjustment. This makes it possible to increase the stiffness of the actuating members 3, for example during the launch of a rocket loaded onto the device. This also makes it possible to support a heavier equipment under such conditions.

As regards the linking of the body 10 to the base 1 and the platform 2 more specifically, the linking members 12 and 13 in FIGS. 2 and 3 each comprise a shoulder 60 defining an outer surface to the right of which a threaded shaft 61 provided to cooperate with a nut 62 extends.

The shoulder 60 of the linking member 12, respectively 13, is connected to the lower 22, respectively upper 23, end of the body 10 by a link rod 63 which is fastened to these parts so as to extend, on one side, to the right of an outer surface of the lower 22, respectively upper 23, end of the body 10 and, on the other side, to the right of an inner surface of the shoulder 60 of the linking member 12, respectively 13.

The link rod 63 of each of the linking members 12 and 13 is configured to allow a relative displacement of these linking members 12 and 13 with respect to the body 10, each defining a ball joint link.

With reference to FIGS. 1 to 3 and to the description above, the actuating member 3 can thus be connected to the base 1 via the linking member 12 and to the platform 2 via the linking member 13.

To this end, the threaded shaft 61 of the linking member 13 is housed in one of the openings 9 of the platform 2 such that the outer surface of the shoulder 60 is supported on a surface of the platform 2 and such that the nut 62 engaged on the threaded shaft 61 locks this link by exerting a gripping force on a bearing surface formed by the counterbore of this opening 9.

In an analogous manner, the threaded shaft 61 of the linking member 12 is housed in one of the openings 6 of the base 1 such that the outer surface of the shoulder 60 is supported on a surface of the base 1 and such that the nut 62 engaged on the threaded shaft 61 locks this link by exerting a gripping force on a bearing surface formed by the counterbore of this opening 6.

Such linking members 12 and 13 make it possible to reduce tribological problems, in particular when the device is placed in a vacuum environment, and thus to avoid having, for example, to treat the contact surfaces.

As regards now the control mechanism 14, in this example the latter comprises two adjustment screws 11 and 52 which each allow the body 10 to be deformed with a respective level of precision.

The screw 11 in FIGS. 2 and 3 is a micrometer screw, or a differential screw, extending along the direction D1 and having an axis of rotation A1.

This screw 11 comprises a first portion (on the right in FIG. 3) which has a first external thread and a second portion (on the left in FIG. 3) which has a second external thread, the pitch of which is different from that of the first external thread.

The screw 52 forms a sleeve having, on one side, an internal thread which cooperates with said second thread of the screw 11 and, on the other side, an external thread.

With reference to FIG. 3, the control mechanism 14 moreover comprises two collars 50 and 51 and two locknuts 53 and 54.

The collar 51 is mounted recessed, for example by screwing or bonding, in an orifice passing through the linking part 21 of the body 10 according to the direction D1.

This collar 51 comprises a stepped inner opening which passes through it along the direction D1 and which defines, along the direction D1 and from right to left in FIG. 3, a first portion forming an internal thread cooperating with said first external thread of the screw 11 and a second portion forming a smooth orifice which has a diameter greater than the diameter of the first portion of the screw 11.

As regards the collar 50, the latter forms a stepped tube defining, along the direction D1 and from right to left in FIG. 3, a first portion and a second portion.

The first portion of the collar 50 has an inner diameter greater than the diameter of the first and second portions of the screw 11 and an outer diameter slightly smaller than the diameter of the orifice formed by the second portion of the collar 51.

The first portion of the collar 50 is received in the orifice formed by the second portion of the collar 51 so as to form with the latter a sliding pivot link, ensuring translational guiding when the collars 50 and 51 are displaced with respect to one another along the control direction D1.

The second portion of the collar 50 is mounted recessed in an orifice passing through the linking part 20 of the body 10 according to the direction D1 and comprises an inner surface forming an internal thread and having an inner diameter greater than the inner diameter of the first portion of the collar 50.

The external thread of the screw 52 cooperates with the internal thread of the second portion of the collar 50.

In this example, the first external thread of the screw 11 as well as the internal thread of the first portion of the collar 51 have a pitch of 0.2 mm, the second external thread of the screw 11 as well as the internal thread of the screw 52 have a pitch of 0.225 mm and the external thread of the screw 52 as well as the internal thread of the second portion of the collar 50 have a pitch of 0.5 mm.

Such a control mechanism 14 makes it possible to carry out two types of adjustment as a function of the precision or amount of displacement required.

On the one hand, the screw 11 makes it possible to carry out a fine adjustment in view of the relatively small difference between the pitch of the second external thread and that of the first external thread of this screw 11, this difference being 0.025 mm in this example.

To this end, the locknut 54 is loosened or removed while the locknut 53 is clamped against the collar 50 so as to block the rotation of the screw 52 with respect to the collar 50.

The screw 11 is then driven rotationally, causing, as a function of its sense of rotation about the axis A1, a bringing together or a moving apart of the linking parts 20 and 21 of the body 10 and, as a result, respectively an increase or a decrease of the dimension X4 of the body 10 according to the actuation direction D2, causing a displacement of the platform 2 with respect to the base 1.

On the other hand, the screw 52 makes it possible to carry out a coarser adjustment in view of the relative difference between the pitch of the external thread of the screw 52 and the pitch of the second external thread of the screw 11. In this example, this difference is 0.3 mm, thus relatively large compared with that between the pitch of the first and second external threads of the screw 11.

To carry out this second type of adjustment, the locknut 53 is loosened or removed while the locknut 54 is clamped against the screw 52 so as to rotationally interlock the screw 52 and the second portion of the screw 11.

The screw 52 is then driven rotationally, causing, as a function of its sense of rotation about the axis A1, a bringing together or a moving apart of the linking parts 20 and 21 of the body 10 and, as a result, respectively an increase or a decrease of the dimension X4 of the body 10 according to the actuation direction D2, causing a displacement of the platform 2 with respect to the base 1.

The control mechanism 14 thus ensures a transformation of a rotational movement of the screw 11 or of the screws 11 and 52 about the axis A1 into a translational movement of the effector component 23 along the actuation direction D2.

In this example, the spring 15 is a compression spring interposed between the linking parts 20 and 21 of the body 10 so as to exert a force on them tending to move them apart according to the direction D1.

The pretensioning thus exerted by the spring 15 makes it possible to reduce or remove the play in the threads.

In FIGS. 2 and 3, the actuating member 3 is shown in a nominal position, i.e. a position in which the body 10 is in the free state, without a deformation tension exerted by the control mechanism 14.

In the nominal position, the tabs 40 and 41 borne by the linking part 20 of the body 10 are positioned halfway between the inner 32A and outer 33A abutment surfaces formed by the stop components 30 and 31. Similarly, the tabs 40 and 41 borne by the linking part 21 of the body 10 are positioned halfway between the inner 32B and outer 33B abutment surfaces formed by the stop components 30 and 31 (see FIG. 3).

It is thus possible, starting from this nominal position, to displace the adjustment screw 11 and/or 52 in the two senses of rotation and thus to increase or decrease the length X4 of the body 10 according to the actuation direction D2.

By way of example, the body 10 of the actuating member 3, the linking members 12 and 13 and the rods 63 can be made of a steel comprising nickel, cobalt and molybdenum, such as the steel known by the name "MARVAL18".

The body 10 can be machined by electrical discharge machining, while the linking members 12 and 13 and the rods 63 can be machined by milling.

Alternatively, the assembly formed by the body 10, the linking members 12 and 13 and the rods 63 can be produced by additive manufacturing.

Optionally, the assembly mentioned above can be produced by additive manufacturing with the base 1 and the platform 2 so as to form one and the same part.

The screw 11 and the collar 50 can comprise 316L stainless steel, while the screw 52 and the collar 51 can comprise an alloy of the beryllium copper type, so as to alternate the materials and thus reduce the friction coefficients.

With reference to FIG. 1, the invention thus makes it possible to modify the length of the actuating members 3 according to their respective actuation direction independently and without the use of adjustment discs.

It is thus possible to position the platform 2 and its equipment with high precision in three-dimensional space, in the six degrees of freedom.

In this example, it is estimated that the precision of translational positioning is of the order of the micron, with a range of adjustment of the order of 0.5 mm, and that the precision of rotational positioning is of the order of a few thousandths of a degree, with a range of adjustment of the order of 0.7°.

The invention also makes it possible to reduce the mass and the size of the device and to give it high resistance to mechanical stresses such as vibrations induced by a rocket.

The description above is non-limitative and numerous variants can be envisioned without exceeding the scope of the invention.

Figure 4:
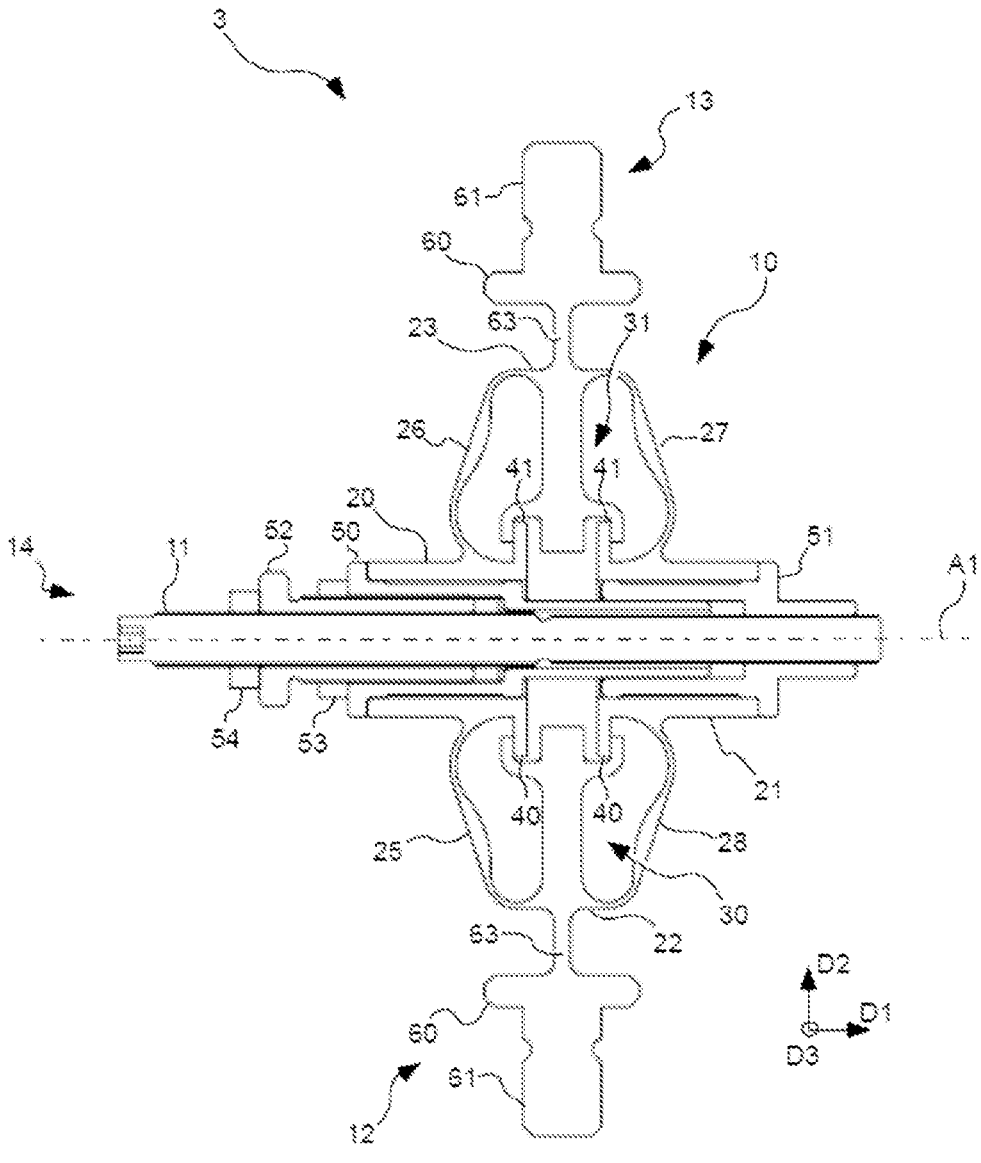
FIG. 4 is a diagrammatic cross-section view of an actuating member according to a second embodiment of the invention.

For example, FIG. 4 shows an actuating member 3 which is mainly distinguished from that in FIGS. 2 and 3 in that it does not comprise a pretension spring 15. The actuating member 3 in FIG. 4 is here described only according to its main differences with respect to FIGS. 2 and 3, the description above applying by analogy to this embodiment.

With reference to FIG. 4, the tabs 40 and 41 of each of the linking parts 20 and 21 of the body 10 are supported on the outer abutment surfaces 33A and 33B formed by the stop components 30 and 31 when the body 10 is in a nominal position.

Thus, starting from this nominal position, the body 10 can be deformed so as to displace the effector component 23 only in one sense along the actuation direction D2.

In this example, the pretensioning is carried out by the body 10 itself, which exerts on the linking parts 20 and 21 a force tending to separate them from one another according to the direction D1.

Figure 5:
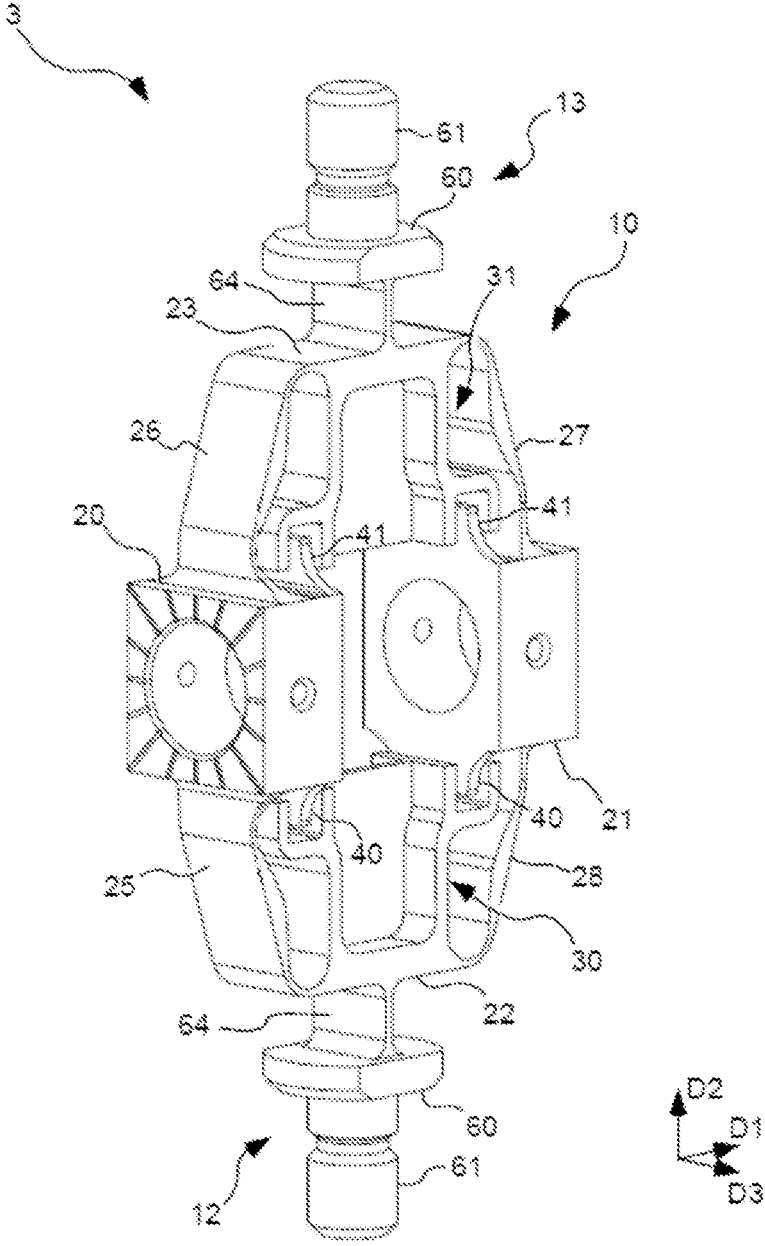
FIG. 5 is a diagrammatic perspective view of an actuating member according to a third embodiment of the invention.

FIG. 5 presents another embodiment, in which the linking members 12 and 13 are connected to the body 10 not by rods but by strips 64.

Such link strips 64 allow a relative displacement of these linking members 12 and 13 with respect to the body 10 in one degree of freedom, forming pivot links.

In other embodiment variants that are not shown, the body 10 can be connected to the base 1 and/or to the platform 2 without a degree of freedom in rotation. For example, the threaded component 61 of the linking member 12 described above with reference to FIGS. 2 and 3 can extend directly to the right of the outer surface of the lower end 22 of the body 10, i.e. without a link rod or strip.

According to a variant that is not shown, it is possible that the body 10 of the actuating member 3 does not comprise the strips 25 and 28, or the lower end 22, or the linking member 12 that are present in the different embodiments in FIGS. 1 to 5. In particular, the linking parts 20 and 21 of the body 10 can be connected directly to the base 1, for example by a slide link so as to allow a relative displacement of these linking parts 20 and 21 along the control direction D1 during the adjustment of the position of the effector component 23.

The control mechanism 14 can comprise a single adjustment screw 11, in which case its second portion can cooperate directly with the collar 50 by a helical link.

In addition, the external threads of the screw 11 and/or of the screw 52 can cooperate directly with internal threads formed by the linking parts 20 and 21 of the body 10, i.e. without using collars 50/51.

According to another variant that is not shown, the collar 50 described above may be lacking its first portion so as not to cooperate with the collar 51. More generally, it is possible that the actuating member 3 does not comprise means for translational guiding when the linking parts 20 and 21 are displaced with respect to one another along the control direction D1, or lacks different guide means.

According to yet another variant that is not shown, the platform 2 in FIG. 1 can form, per se, a portion of the equipment to be positioned. In other words, the actuating members 3 can be directly connected to the equipment.

The embodiments and embodiment variants described above can moreover be combined. For example, the linking members 12 and 13 of the actuating member 3 in FIG. 4 can be connected to the body 10 by link strips 64 similar to those illustrated in FIG. 5.

The device can moreover comprise a single actuating member 3 according to the invention, or several actuating members 3 according to the invention which can be different from one another.

For example, in the context of an application in which the equipment is a plane mirror, the device can comprise a single actuating member 3 according to any one of the embodiments described above.

The invention claimed is:

1. A device for positioning an equipment such as a space optical instrument mirror, comprising:
    a platform intended to receive the equipment or forming a portion of the equipment, and six actuating members connected to the platform;
    each of said actuating members comprises a body that is elastically deformable and a control mechanism suitable for deformation of the body so as to modify the position of the platform;
    the control mechanism comprises a micrometer screw; and
    the micrometer screw forms a first adjustment screw, the control mechanism comprising a second adjustment screw provided with an orifice forming an internal thread which cooperates with an external thread of the first screw, the control mechanism suitable for deformation of the body under the action of a rotational displacement of the first screw and/or of the second screw.

2. The device according to claim 1, in which the body comprises an effector component and two arms each connected to the effector component such that the arms are spaced apart with respect to one another according to a control direction, the control mechanism being configured to apply to the arms a mechanical force capable of modifying the distance separating them according to the control direction so as to displace the effector component according to an actuation direction that is perpendicular or oblique with respect to the control direction.

3. The device according to claim 2, in which each of the arms of the body comprises a linking part connected to the control mechanism and a flexible component such as a strip connecting the linking part to the effector component of the body.

4. The device according to claim 1, in which the body is connected to the platform by a linking member, this linking member being connected to the body by a link defining at least one degree of freedom.

5. The device according to claim 4, in which the linking member is connected to the body by a rod or a strip.

6. A method for positioning an equipment, such as a space optical instrument mirror, using a device according to claim 1.

* * * * *